(12) United States Patent
Nelson

(10) Patent No.: US 8,237,873 B2
(45) Date of Patent: Aug. 7, 2012

(54) METHOD FOR CREATING BLENDING RAMPS FOR COMPLEX PROJECTOR IMAGE OVERLAPS

(75) Inventor: Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 336 days.

(21) Appl. No.: 12/730,470

(22) Filed: Mar. 24, 2010

(65) Prior Publication Data
US 2011/0234920 A1 Sep. 29, 2011

(51) Int. Cl.
*H04N 3/26* (2006.01)
*H04N 3/22* (2006.01)

(52) U.S. Cl. ...................................... 348/745

(58) Field of Classification Search .......... 348/744–746, 348/747, 806–807, 383, 189–191, 658, 778, 348/756, 781, 785, 750; 345/626, 634–635, 345/639, 640, 641, 1.1, 4, 1.3; *H04N 3/26, H04N 3/22*
See application file for complete search history.

(56) References Cited

U.S. PATENT DOCUMENTS

| | | | |
|---|---|---|---|
| 4,974,073 A | 11/1990 | Inova | |
| 5,668,569 A | 9/1997 | Greene et al. | |
| 6,377,306 B1 | 4/2002 | Johnson et al. | |
| 6,456,339 B1 * | 9/2002 | Surati et al. | 348/745 |
| 6,480,175 B1 * | 11/2002 | Schneider | 345/32 |
| 6,570,623 B1 | 5/2003 | Li et al. | |
| 6,833,879 B1 * | 12/2004 | Angel et al. | 348/744 |
| 2007/0188719 A1 | 8/2007 | Jaynes et al. | |
| 2007/0291189 A1 | 12/2007 | Harville | |
| 2008/0266321 A1 | 10/2008 | Aufranc et al. | |

OTHER PUBLICATIONS

A Low-Cost Projector Mosaic with Fast Registration, Ramesh Raskar, Jeroen Van Baar and Jin Xiang Chai, Mitsubishi Electric Research Laboratories, Feb. 2002, (pp. 1-6).

* cited by examiner

*Primary Examiner* — Trang U Tran
(74) *Attorney, Agent, or Firm* — Mark P. Watson

(57) ABSTRACT

Three or more projectors project their respective images to form a composite image. In some cases all three projected images overlap. In order to compensate for distortions in this overlap, blending values are assigned to the projector pixels that contribute to the overlap regions. Pixels that contribute to the overlap of two projectors are assigned a blending value associated with this projector pair. Pixels that contribute to the overlap of three projectors are assigned a blending value that is the greater of the two blending values associated with the two projector pairs, after such blending value has been scaled.

15 Claims, 30 Drawing Sheets

| 0 | 1 | 2 | 3 |
|---|---|---|---|
| 4 | 5 | 6 | 7 |

```
public void processTriplePairs(final ProjectorDataArray
projectorDataArray) {
      logger.debug("processTriplePairs In");
      for (int i=0; i < intersectWidth; i++) {
         for (int j=0; j < intersectHeight; j++) {
            final int count = this.getProjectorPairCount(j, i);
            if (count == 1) {
               final ProjectorPair projectorPair =
this.getProjectorPairOnly(j, i);
               if (projectorPair.isTriple()) {
                  final int displayNumCommon =
projectorPair.getDisplayNumCommon();
                     logger.debug("processTriplePairs found triple
displayNumCommon=" + displayNumCommon);
                     final ProjectorData projectorDataCommon =
projectorDataArray.getByDisplayNum(displayNumCommon);
                     final VPMPoint fullSizeCameraCoords =
getFullSizeCameraCoords(j, i);
                     final VPMPoint smallSizeCameraCoords =
projectorDataCommon.getSmallCameraCoords(fullSizeCameraCoords);

final OctaveNdMatrix blendingRamp1 =
projectorDataCommon.getBlendingRamp(projectorPair.getProjectorPair1());
                     final OctaveNdMatrix blendingRamp2 =
projectorDataCommon.getBlendingRamp(projectorPair.getProjectorPair2());

final double value1 =
blendingRamp1.get(smallSizeCameraCoords.getRow(),smallSizeCameraCoords.g
etColumn());
                     final double value2 =
blendingRamp2.get(smallSizeCameraCoords.getRow(),smallSizeCameraCoords.g
etColumn());

logger.debug("processTriplePairs triple
smallCameraCoords=" + smallSizeCameraCoords + " 1-based value1=" +
value1 + " value2=" + value2);

// We set the primary pair with the blending
value that is greater (subtracted from 1.0 so essentially
                     // the dimmest). The primary pair is set so we
use this value when blending. For now we ignore
                     // the other value.
                     if (value1 > value2) {
                        logger.debug("processTriplePairs primary is
projector1=" + projectorPair.getProjectorPair1().getAsKey());

projectorPair.setPrimaryPair(projectorPair.getProjectorPair1(),1);
                     }
                     else {
                        logger.debug("processTriplePairs primary is
projector2=" + projectorPair.getProjectorPair2().getAsKey());

projectorPair.setPrimaryPair(projectorPair.getProjectorPair2(),2);
                     }
               }
            }
         }
      }
      logger.debug("processTriplePairs Out");
   }
```

FIG. 13

```
public void calculateBlendScaleFactors() {
    for (int i=0; i < intersectWidth; i++) {
        for (int j=0; j < intersectHeight; j++) { int nonNullCount = 0;
            int firstNull = -1;
            for (int k=0; k < layers; k++) {
                if (getProjectorPair(k, j, i) != null) {
                    ++nonNullCount;
                }
                else {
                    firstNull = k;
                }
            } if ((nonNullCount == HORIZONTAL_LAYER_DEPTH)
&& (firstNull >= HORIZONTAL_LAYER_DEPTH)) {
                // We only have first two horizontal
blending layers, do nothing as the scale
                // factor has already been set with
horizontal blending ramps created in
                //
BlendingRampLayout.createBlendingRampBetweenHorizontalRamps(
)
            }
            else if (nonNullCount > 0) {
                if (nonNullCount > 1) {
logger.debug("calculateBlendScaleFactors nonNullCount > 1
count=" + nonNullCount);
                }
                final double blendScaleFactor = 1.0 /
((double)nonNullCount);
                for (int k=0; k < layers; k++) {
                    // Original 11/10/09
setBlendScaleFactor(blendScaleFactor,k,j,i);
                }
            }
        }
    }
}
```

FIG. 14

```
/**
 * Sets the blending values for a point inside the
intersect bounding box.  Throws exception if point is outside
 * intersect region.
 *
 * @param projectorIntersection intersection region found
for this display and coordinates
 * @param cameraRow 1-based camera row relative to
cropped projector image
 * @param cameraColumn 1-based camera column relative to
cropped projector image
 * @param blendingRampValues
 */
    private void getIntersectBlendingValue(final
ProjectorIntersection projectorIntersection,final int
cameraRow, final int cameraColumn,BlendingRampValues
blendingRampValues) {
        assert(cameraRow > 0);
        assert(cameraColumn > 0);
        /** one based camera row in full-sized camera image */
        final int fullCameraRow = cameraRow +
projectorData.getProjectorRect().getRowMin() - 1;
        /** one based camera column in full-sized camera image
*/
        final int fullCameraColumn = cameraColumn +
projectorData.getProjectorRect().getColumnMin() - 1;
        /** zero based offset into small intersect rect area
*/
        final int intersectRow = fullCameraRow -
projectorIntersection.getIntersectRect().getRowMin();
        /** zero based offset into small intersect rect area
*/
        final int intersectColumn = fullCameraColumn -
projectorIntersection.getIntersectRect().getColumnMin();

if ((intersectColumn >= 0) && (intersectColumn <
projectorIntersection.getIntersectWidth()) && (intersectRow >=
0) && (intersectRow <
    projectorIntersection.getIntersectHeight())) {
            // Get projector pair
            try {
                ProjectorPair projectorPair;
                if
(projectorIntersection.getProjectorPairCount(intersectRow,inte
rsectColumn) == 0) {
                    // If no projector pair is valid for this
point, we assume there is a small hole where a single
projector
                    // fills the gap.
projectorData.getBlendingRampValue(cameraRow,
cameraColumn,blendingRampValues);
                }
                else if ((projectorPair =
projectorIntersection.getProjectorPairForDisplayNum(intersectR
ow,intersectColumn,displayNum)) != null) {
```

```
                }
            else if
(projectorPair.getProjectorPair1().isMember(displayNum) ==
true) {
                if (projectorPair.getPrimaryPairNumber() ==
1) {
                    final OctaveNdMatrix matrix =
blendingRamps.get(projectorPair.getProjectorPair1());
                    final double value =
matrix.get(cameraRow,cameraColumn);
blendingRampValues.subtractFromBlendValue = value;
                    blendingRampValues.regionNumber =
projectorPair.getRampNumber();
                }
                else {
blendingRampValues.subtractFromBlendValue =
BlendingRampValues.BLENDVALUE_BLACK;
                }
            }
            else if
(projectorPair.getProjectorPair2().isMember(displayNum) ==
true) {
                if (projectorPair.getPrimaryPairNumber() ==
2) {
                    final OctaveNdMatrix matrix =
blendingRamps.get(projectorPair.getProjectorPair2());
                    final double value =
matrix.get(cameraRow,cameraColumn);
blendingRampValues.subtractFromBlendValue = value;
                    blendingRampValues.regionNumber =
projectorPair.getRampNumber();
                }
                else {
blendingRampValues.subtractFromBlendValue =
BlendingRampValues.BLENDVALUE_BLACK;
                }
            }
            else {
                final String message =
"getBlendingRampValueWithPair displayNum=" + displayNum + "
not a member of triple projector pair=" + projectorPair;
                logger.error(message);
                throw new IllegalStateException(message);
            }
        }
    }
```

```
/**
 * For processing in the column direction up/down image.
 *
 * @param outputMatrix
 * @param resultsMask
 */
private void checkMaskColumns(final OctaveNdMatrix
outputMatrix,final BufferedImage resultsMask) {
    logger.debug("checkMaskColumns In");
    final int width = resultsMask.getWidth();
    final int height = resultsMask.getHeight();
    final Raster rasterMask = resultsMask.getRaster();
    logger.debug("checkMaskColumns width=" + width + "
height=" + height);

final int[] rowPixels = new int[width];
    final double[] rowMatrix = new double[width];
    int rowChanges = 0;
    int count;

for (int j=0; j < height; j++) {
        rasterMask.getPixels(0, j, width, 1, rowPixels);

for (int i=0; i < width; i++) {
            rowMatrix[i] = outputMatrix.get(j+1,i+1);
        } if (processMaskLine(rowPixels,rowMatrix) ==
true) {
            // changes were made
            for (int i=0; i < width; i++) {
                outputMatrix.set(rowMatrix[i],j+1,i+1);
            }
            ++rowChanges;
        }
    }
    logger.debug("checkMaskColumns Out rowChanges=" +
rowChanges);
}
```

FIG. 21

```java
private boolean processMaskLine(final int[] pixelLine, final double[] matrixLine) {
    assert(pixelLine.length == matrixLine.length);
    boolean changedMatrix = false;
    boolean foundNonZeroPixels = false;
    int length = pixelLine.length;

// Set to zero all pixels where mask is zero
    for (int i=0; i < length; i++) {
        if (pixelLine[i] == 0) {
            matrixLine[i] = 0;
            changedMatrix = true;
        }
        else if (pixelLine[i] > 0) {
            foundNonZeroPixels = true;
        }
    } if (foundNonZeroPixels == true) {
        // We are only interested in the ends where new pixel
        // rows/columns may need to be added
        int startOffset = -1;
        int endOffset = -1;
        for (int i=0; i < length; i++) {
            if (matrixLine[i] > 0) {
                startOffset = i;
                break;
            }
        } for (int i=length-1; i >= 0; i--) {
            if (matrixLine[i] > 0) {
                endOffset = i;
                break;
            }
        } assert(startOffset > -1);
        assert(endOffset > -1);

// Check for any gaps in interior
        for (int i=startOffset+1; i < endOffset; i++) {
            if ((matrixLine[i] <= 0) && (pixelLine[i] > 0)) {
                //logger.debug("processMaskLine found hole i=" + i + " setting matrixLine[i] to matrixLine[i-1]=" + matrixLine[i-1]);
                matrixLine[i] = matrixLine[i-1];
                changedMatrix = true;
            }
        } for (int i = startOffset-1; i >= 0; i--) {
            if ((pixelLine[i] > 0) && (matrixLine[i] <= 0)) {
                matrixLine[i] = matrixLine[i+1];
                changedMatrix = true;
            }
        } for (int i = endOffset+1; i < length; i++) {
            if ((pixelLine[i] > 0) && (matrixLine[i] <= 0)) {
                matrixLine[i] = matrixLine[i-1];
                changedMatrix = true;
            }
        }
    }
    return changedMatrix;
}
```

FIG. 22

```
    private void filterColumns(final OctaveNdMatrix
outputMatrix) {
        logger.debug("filterColumns In");
        final int[] size = outputMatrix.getSize();
        final int rows = size[0];
        final int columns = size[1];
        int invalidRows=0;
        final double[] rowArray = new double[columns];

for (int i=1; i <=rows; i++) {
            double accumulator=0;
            double value;
            double nonZeroCount=0;

// calculate average for this row
            for (int j=1; j <= columns; j++) {
                value = outputMatrix.get(i,j);
                rowArray[j-1] = value;
                if (value != 0) {
                    accumulator += value;
                    ++nonZeroCount;
                }
            }
            final double columnAverage = accumulator /
nonZeroCount;
            final double variance = columnAverage *
VARIANCE;
            final double allowableMin = columnAverage -
variance;
            final double allowableMax = columnAverage +
variance;

if
(correctInvalidItems(rowArray,allowableMin,allowableMax) ==
true) {
                // copy the column back to the matrix
                for (int j=1; j <= columns; j++) {
                    outputMatrix.set(rowArray[j-1],i,j);
                }
                ++invalidRows;
            }
        }
        logger.debug("filterColumns Out invalidRows=" +
invalidRows);
    }
```

FIG. 23

```
    private boolean correctInvalidItems(final double[]
line,final double allowableMin,final double allowableMax) {
        boolean correctedItems = false;

// find any members of this column that are way
above/below average
        final int length = line.length;
        for (int j=0; j < length; j++) {
            double value = line[j];
            if (value != 0) {
                // find average using items above and below
                if ((value < allowableMin) || (value >
allowableMax)) {
                    // find average of neighbors
                    double neighborAccumulator = 0;
                    double neighborCount = 0;
                    for (int k=j+1; k <
Math.min(j+NEIGHBOR_COUNT,length); k++) {
                        value = line[k];
                        if (value == 0) {
                            break;
                        }
                        if ((value >= allowableMin) &&
(value <= allowableMax)) {
                            neighborAccumulator += value;
                            ++neighborCount;
                        }
                    }
                    for (int k=j-1; k >= Math.max(j-
NEIGHBOR_COUNT,0); k--) {
                        value = line[k];
                        if (value == 0) {
                            break;
                        }
                        if ((value >= allowableMin) &&
(value <= allowableMax)) {
                            neighborAccumulator += value;
                            ++neighborCount;
                        }
                    }
                    if (neighborCount > 0) {
                        double newValue =
neighborAccumulator / neighborCount;
                        line[j] = newValue;
                        correctedItems = true;
                    }
                }
            }
        }
        return correctedItems;
    }
```

FIG. 24

METHOD FOR CREATING BLENDING RAMPS FOR COMPLEX PROJECTOR IMAGE OVERLAPS

CROSS-REFERENCE TO RELATED APPLICATIONS

This application is related to commonly assigned U.S. patent application Ser. No. 12/501,162, filed Jul. 10, 2009, which is hereby incorporated by reference in its entirety.

BACKGROUND

The present invention is related to a multiple projector system. In this system multiple projectors are controlled and coordinated to provide a large display region such as a wall display. In such a display the goal is to provide a seamless image. However, in certain areas there is an overlap region where two projectors contribute light output to the same portion of the display surface. Unfortunately the combination from two projectors in this overlap region is additive and results in a brighter region with color differences. The overlap region is thus a visible band in the overall displayed image.

In order to minimize the visual band that occurs from the overlap region, a number of techniques have been proposed to "blend" the image to reduce the visual differences from one region to another. A simple blending method would output pixels in the overlapping edge regions of projector A and B at only 50% of their source brightness. Or, similarly, another simple method would have the pixels in the overlapping edge region of projector A be set to black (0% brightness) and pixels from overlapping edge region of projector B be left unchanged. Either method might conclude that the additive output will equate with 100% source brightness on the display surface.

However, this assumption incorrectly simplifies conditions that exist with actual projectors. With such an approach, boundaries between non-overlapped and overlapped regions (at the left or right edges) require perfect alignment or results are visible as bright seams or gaps. Also, the extra light output by a single projector, even if emitting black, can affect the color blending enough to notice the edge boundaries. Device light output levels are seldom identical and so the 50%/50% approach cannot ensure success. Better blending is required to smoothly transition among non-overlapping and overlapping regions.

One better technique is to gradually reduce the output brightness for each projector pixel in the overlapping region in a reciprocal fashion. The brightness level of one projector gradual diminishes while the brightness of the other increases across the overlapping region. Each individual projector therefore contributes maximum brightness at its inside edge, equivalent to the non-overlapping regions nearest said edge, and contributes minimum brightness at its outside edge, furthest overlapped into the opposite projector at the boundary to the opposite projector's non-overlapped region. For example, pixels at the inside edges of the overlapping region are output at 100% brightness, while pixels at the outside edges are output at 0% brightness. This ensures that at any point between the left and right edges, exactly 100% brightness will be achieved through a combination of the brightness of projector A plus the brightness of projector B. Since each logical pixel in the overlap region has some brightness value from either projector A or B, and no logical pixel contributes more than 100% brightness, there should be no seams or gaps.

Again, in actual practice, this better but still simple technique results in some visual bands or gaps in the image. Thus, in practice, the projectors are further adjusted using different blending formulas until the overall image looks fairly uniform. The terms "function," "formula," and "algorithm" are used interchangeably herein to describe any method that blends or smoothes the overlap region formed between two projected images. As will be appreciated, there are an infinite number of blending formulas that can be used. But, there was no method available to determine the best formula for a particular situation, i.e., a particular set of projectors. Commonly assigned U.S. patent application Ser. No. 12/501,162, filed Jul. 10, 2009, which is hereby incorporated by reference in its entirety, addressed the problem of determining the best formula for a particular situation.

Our prior work was focused only on horizontal or vertical strips of projector configurations such as one row or column with two projectors (1×2), one row or column with three projectors (1×3), up to one row or column with four projectors (1×4). This worked well but the aspect ratio of such configurations was towards the panoramic and did not match the aspect ratio of most common media formats. With recent work to add more projectors (up to eight) to a single system we needed a new blending approach that would allow projector configurations such as two rows and two columns with two projectors stacked in each of the two columns (2×2), two rows and three columns with two projectors stacked in each of the three columns (2×3), and two rows and four columns with two projectors stacked in each of the four columns (2×4). These configurations create a greater challenge than the previous system that only had to blend the output between two projectors. These new configurations required a blending approach that would blend up to four projectors in a single overlap region.

SUMMARY OF INVENTION

The present invention applies blending values to projector pixels in a system where two or more projectors project onto a surface and an image projected from one projector overlaps with at an image from at least one other projector. For example, a first projector projects a first image onto a display area. A second projector projects a second image onto the display area at the same time the first image is being projected, the second image overlaps the first image in an overlap portion of the display area to form a double projector overlap image. A third projector projects a third image onto the display area at the same time the first and second images are being projected, the third image overlaps the first and second images in an overlap portion of the display area to form a triple projector overlap image.

The following process is applied to each pixel of each of the three neighboring projectors. A processing unit determines if a first projector pixel projects onto the surface to form the triple projector overlap image, and if the first projector pixel projects onto the surface to form the triple overlap image, the processing unit compares first and second blending values, the first blending value being associated with one pair of projectors and the second blending value being associated with a different pair of projectors. The processing unit selecting the largest blending value, multiplies the largest blending value by a scale factor to obtain a resultant blending value, and assigns the resultant blending value to the first projector pixel.

The processing unit also determines if the first projector pixel projects onto the surface to form the double projector overlap image, and if the first projector pixel projects onto the surface to form the double overlap image, the processor applies the first blending value to the first projector pixel, the first blending value being associated with the first projector and the second or third projector.

If the processing unit determines the projector pixel being examined contributes to neither the double projector overlap nor the triple projector overlap than no blending value is assigned to the projector pixel.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 4 shows an exemplary 2×4 projector configuration;

FIG. 12 shows example code for the main processing loop for the layer reduction:

FIG. 13 shows example code for the processing loop for the triple pairs:

FIG. 14 shows example code for the method calculate BlendScaleFactors( );

FIGS. 15A and 15B show example code for the getIntersectBlendingValue( ) method;

FIGS. 16A and 16B shows example code for the getBlendingRampValueWithPair( ) method;

FIG. 20 shows example code for the method processLine( );

FIG. 21 shows example code for the checkMaskColumns( ) method;

FIG. 22 shows example code for the method processMaskLine( );

FIG. 23 shows example code for the method filterColumns( );

FIG. 24 shows example code for the correctInvalidItems( ) method; and

DESCRIPTION OF THE PREFERRED EMBODIMENTS

Figure 1:
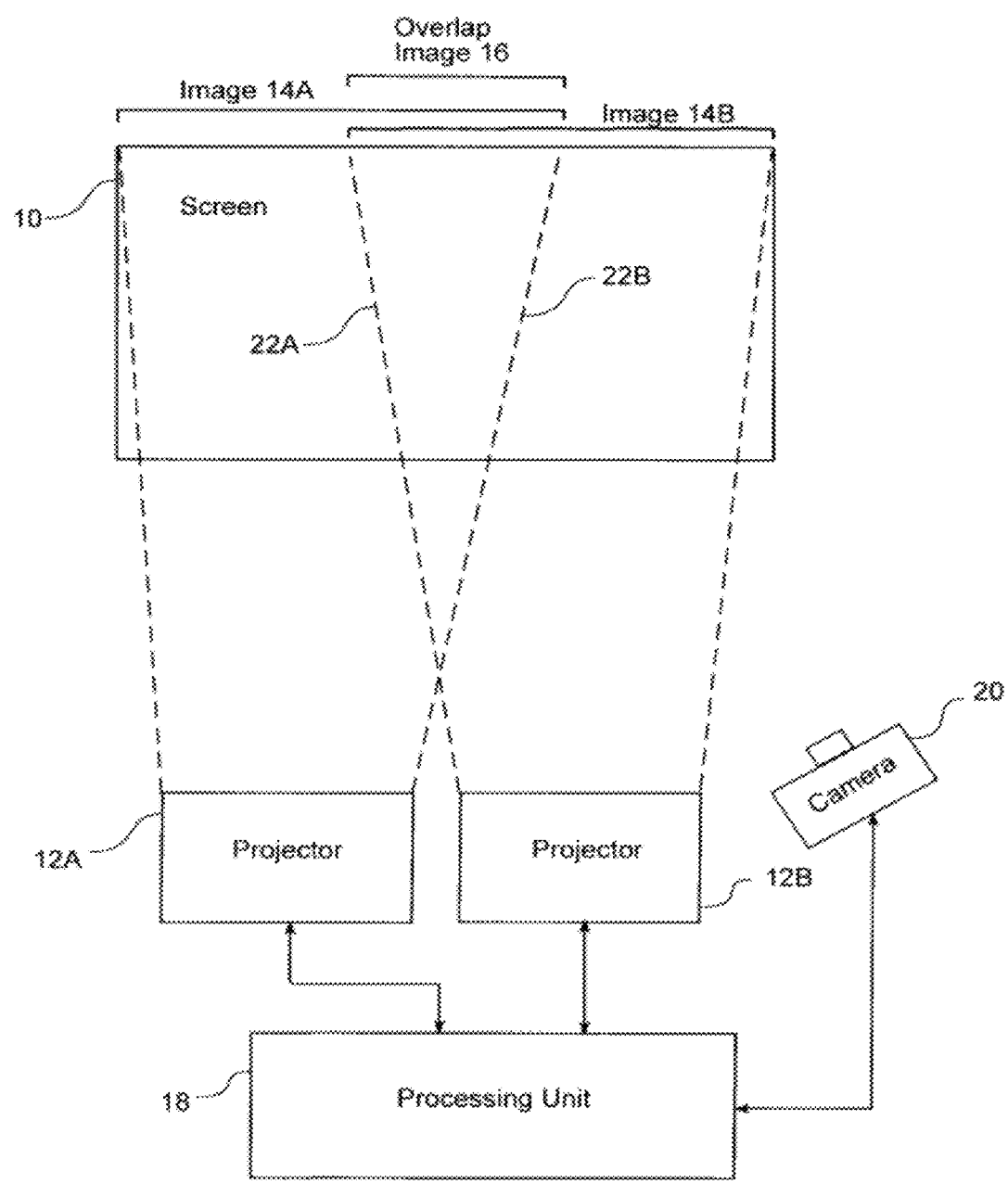
FIG. 1 is a general block diagram of the system of the present invention.

FIG. 1 shows a general system block diagram of the environment of the present invention. In this system, multiple projectors are controlled and coordinated to provide a large display region such as a wall display. In FIG. 1, just two projectors are illustrated for simplicity; however, in a large system three, four, or more projectors may be utilized. Eight projectors are used in an exemplary 2×4 configuration. As shown, projectors 12A and 12B each project an image onto a portion of the screen 10, with image 14A occupying one portion, image 14B occupying a second portion, and overlap image 16 occupying a portion that represents the intersection of images 14A and 14B projected onto screen 10. Using multiple projectors in this manner with overlapping and complementary projections can be used to provide a very large, but still very bright and clear, continuous display.

Various approaches are available to build the multi-projector display of FIG. 1. It is well known that in order to project what appears to be a single continuous image, a camera (or cameras) is used to determine the display surface and each individual projector's intrinsic and extrinsic parameters all in a common coordinate frame. This enables multiple projectors to generate a rectangular image of known aspect ratio even though the projectors themselves are aimed at an arbitrarily inclined planar surface. One approach is to use a camera 20 that has been calibrated by viewing a regularly spaced grid placed on the screen 10, and then registering subsequent images from projectors 12A and 12B to the grid. Another approach is, for each projector, project a structured pattern (e.g. checkerboard), extract features from the pattern and find the camera-projector pixel correspondence, and compute the homography between the projector and camera. The present invention is not concerned with, or confined by, any particular method or algorithm for identifying the homography between the projectors and the camera(s).

Projectors 12A and 12B are preferably of the liquid crystal display (LCD) type, digital light processing (DLP) type, liquid crystal on silicon (LCOS) type, or other digital projection technology type. Projectors 12A and 12B are controlled by processing unit 18 to project their respective images 14A and 14B onto screen 10. The processing unit can be a personal computer (PC), a dedicated processor, a server, or any type of computer processing device. Camera 20 is preferably a digital camera having an image sensor including a camera sensor pixel array. Although only one camera is shown in FIG. 1, a plurality of cameras may be used to obtain multiple projection views, As mentioned in the background of this invention, the overlap image 16 is formed by both projectors 12A and 12B, each contributing light to the same portion of the display surface of screen 10. The combination from two projectors in this overlap region is additive and can result in an overlap image 16 that is brighter than images 14A and 14B with noticeable color differences. The overlap image 16 can be a visible band in the overall displayed image.

As previously discussed, again in the background of the invention, in order to minimize the visual band that occurs from the overlap projections, a number of techniques have been proposed to "blend" the image to reduce the visual differences between image 14A, overlap image 16, and image 14B. As mentioned, one technique is to gradually reduce the output brightness for each projector pixel in the overlapping region in a reciprocal fashion. The brightness level of one projector gradual diminishes while the brightness of the other increases across the overlapping region. Each individual projector therefore contributes maximum brightness at its inside edge, equivalent to the non-overlapping regions nearest said edge, and contributes minimum brightness at its outside edge, furthest overlapped into the opposite projector at the boundary to the opposite projector's non-overlapped region. For example, pixels at the inside edges of the overlapping region are output at 100% brightness, while pixels at the outside edges are output at 0% brightness. This ensures that at any point between the left and right edges, exactly 100% brightness will be achieved through a combination of the brightness of projector A plus the brightness of projector B. Since each logical pixel in the overlap region has some brightness value from either projector A or B, and no logical pixel contributes more than 100% brightness, there should be no seams or gaps.

Using FIG. 1 for illustration, projector 12A is controlled by processing unit 18 to output pixels at overlap edge 22A at 100% brightness and output pixels at overlap edge 22B at 0% brightness with a linear reduction of brightness of pixels from edge 22A to edge 22B. In a reciprocal manner, projector 12B is controlled by processing unit 18 to output pixels at overlap edge 22B at 100% brightness and output pixels at overlap edge 22A at 0% brightness with a linear reduction of brightness of pixels from the edge 22B to edge 22A.

Although this is a good theoretical solution, in practice it is less than ideal. The physical qualities of the projectors, their relative locations, lighting conditions, etc., all affect the projected image. So, once the projectors are in place and ambient lighting is set, different ramping functions (blending ramps) are tested or one ramping function is adjusted (tweaked). Projected images are viewed with each ramping function until an "optimum" result is decided upon. The present invention stores the image captured by camera 20 for a plurality of blends. These captured images are stored in Virtual Pixel Map (VPM) files that form an accurate pixel registration map of each projector. Using the VPM files, each physical device pixel on a projector can be mapped to one or more logical pixels in a virtual region defining the large format display (composite image). This virtual large format display resolution defines the unit of each VPM pixel, which is a virtual pixel in the logical display region. It also defines the relative location of VPM pixels on one device relative to VPM pixels on another. The bounded display region represents a homogenous portion of the logical display region within which every pixel is addressable by at least one physical device pixel.

Figure 2:
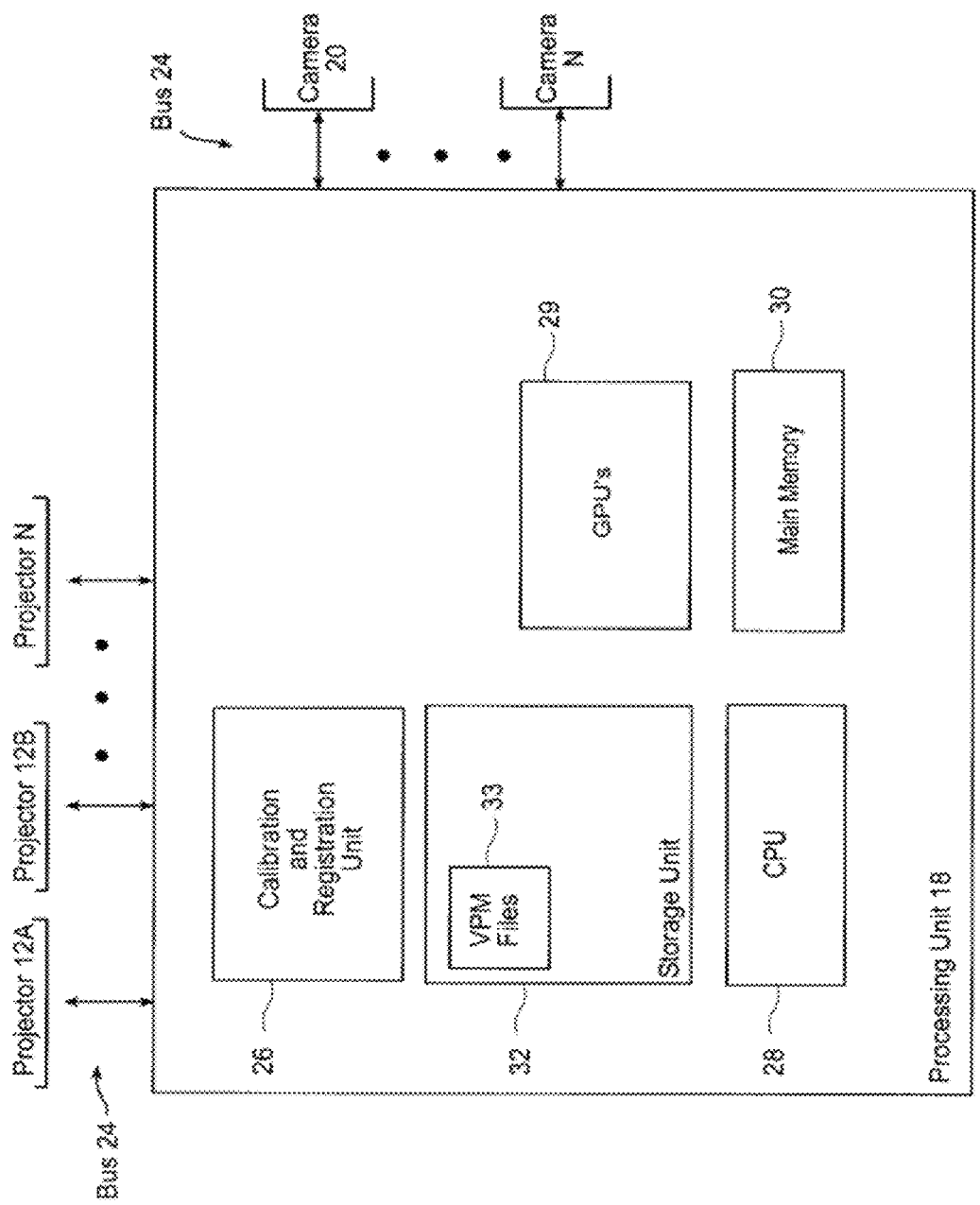
FIG. 2 is a general block diagram of the processing unit of the present invention.

FIG. 2 illustrates processing unit 18 in greater detail. Processing unit 18 interfaces with projectors 12A and 12B (shown in FIG. 1) and can further interface with a number of additional projectors up to projector N. Processing unit 18 also interfaces with camera 20 and can further interface with a number of additional cameras up to camera N. Communication between processing unit 18 and projectors/cameras is via bidirectional bus lines or via a common interface bus. These bus lines (or bus) are shown generally as bus 24 in FIG. 2.

Processing unit 18 may be implemented as a personal computer (PC) and will include various components, as is well known in the art. These will include, for example, a central processing unit (CPU) 28 and a main memory 30, which could include a hard drive, RAM, ROM, CD, etc. Main memory as used herein is all memory that can store, for example, the operating system, application programs, display software, etc. Processing unit 18 may also include one or more graphic processing units 29 (GPUs) to control the projectors. The GPUs allow for much faster processing of the displayed images, and are especially useful for displaying moving images. Processing unit 18, using CPU 28, GPUs 29, and other typical hardware/firmware and the software stored in main memory 30 will control projectors 12A and 12B to project images onto screen 10. Internal busses and connections within the processing unit are omitted for clarity; but, as is well known, one or more busses and/or signal lines connect the various internal units to each other and to external devices such as the projectors and camera.

As discussed above, in order to project what appears to be a single continuous image, each individual projector's intrinsic and extrinsic parameters must all be in a common coordinate frame. This enables multiple projectors to generate a rectangular image of known aspect ratio. Processing unit 18 includes a calibration and registration unit 26 that creates an accurate pixel registration map of each projector. Each physical device pixel on a projector can be mapped to one or more logical pixels in a virtual region defining the large format display (composite image). This virtual region will be referred to herein as a virtual pixel map (VPM). This virtual large format display resolution defines the unit of each VPM pixel, which is a virtual pixel in the logical display region. It also defines the location of VPM pixels on one device relative to VPM pixels on another. The bounded display region represents a homogenous portion of the logical display region within which every pixel is addressable by at least one physical device pixel. As mentioned above, there are numerous methods for creating a virtual pixel map such as grid or structured pattern registration but the present invention is not concerned with or confined by any particular method or algorithm for identifying the homography between the projectors and the camera(s). The processing unit 18 will refer to the virtual pixel map, which may be contained in calibration and registration unit 26, when controlling the projectors to project an image.

The present invention is concerned with determining a best or optimum blend from among a choice of blending functions, formulas, or algorithms (referred to hereinafter generally as "blending functions" or "blending ramps"). To this end, a plurality of blending functions (blending ramps) are stored in storage unit 32, which may be some form of memory, such as RAM. These blending functions can also be stored in main memory or some external memory such as a CD. Alternatively or additionally, one or more blending functions can be stored in storage unit 32, and CPU 28 and/or GPUs 29 can be programmed, via software in main memory 30, to alter one or more blending functions to provide a modified function. In this way, a particularly good blending function can be tweaked to determine a more favorable variation.

Figure 3:
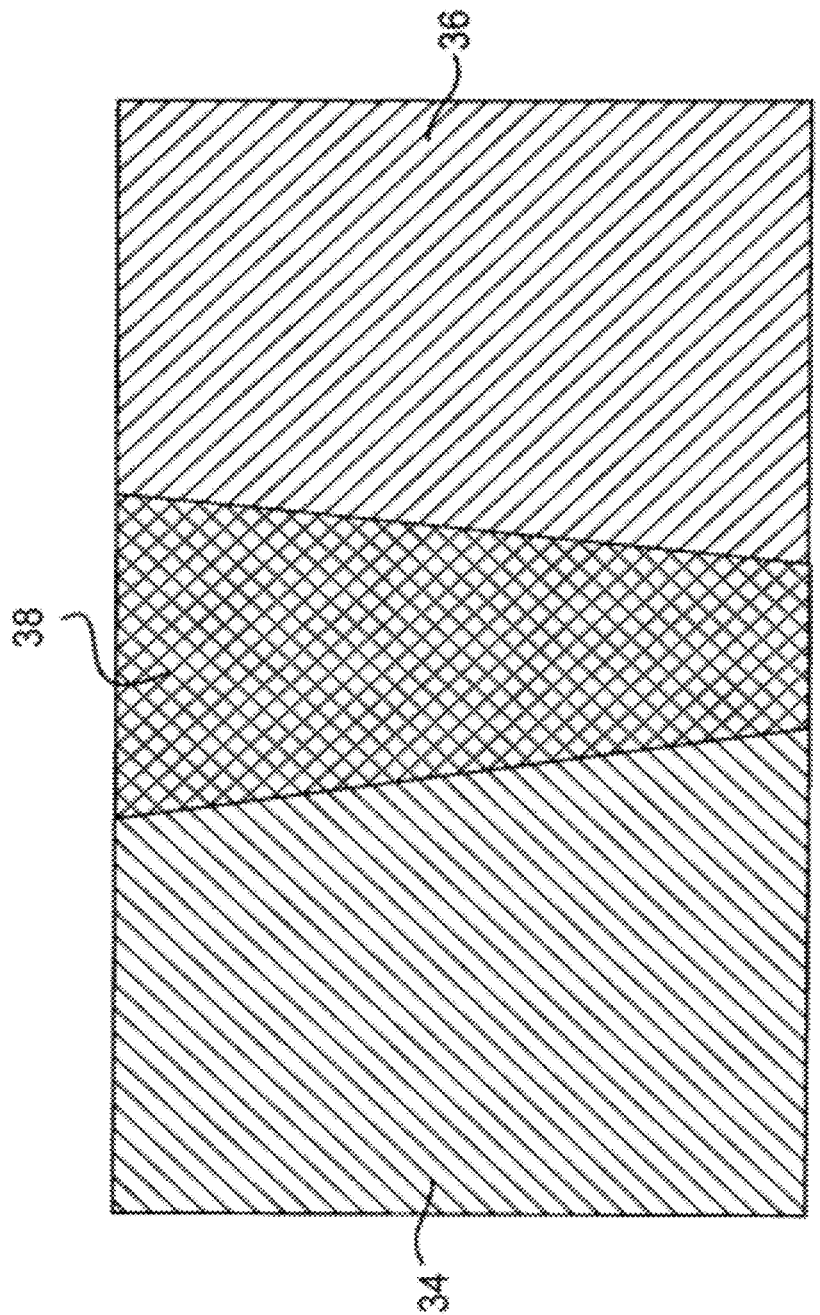
FIG. 3 illustrates the overlap region formed between two projected images.

Each of the blending functions is used to project an image using projectors 12A and 12B. That image is captured by camera 20 and stored in a virtual pixel map (VPM) file 33 in storage unit 32. Each captured image will be composed of pixels, each pixel having a color value and a location in the virtual region defining the large format display (composite image). Each physical projector pixel is mapped to at least one logical pixel in the VPM. Thus, referring to FIG. 3, the virtual region will include a projector 12A display region 34, a projector 12B display region 36, and an overlap region 38.

Figure 4:
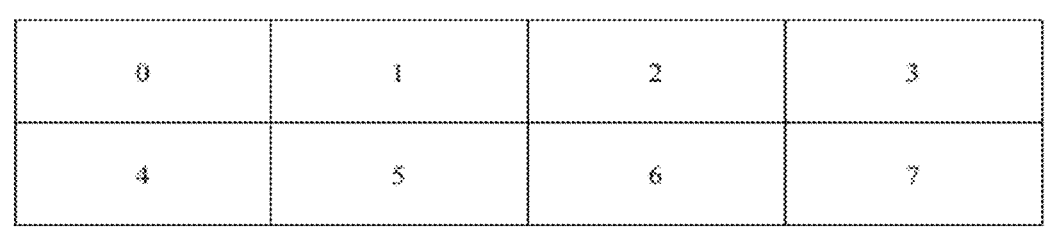

The present invention deals with complex blending regions such as the intersection of four projectors in a 2×2 configuration. In an embodiment, up to eight projectors 12 (2×4 configuration) are supported by a single processor 18 (e.g. PC). This configuration is shown in FIG. 4. Included are eight projectors 12 (numbered 0-7), consisting of 2 rows and 4 columns with 4 projectors in each of the rows, two projectors stacked one on another in each of the four columns.

The following detailed discussion is divided into two sections for ease of understanding:

A. Creating blending ramps for complex projection intersections. This section will discuss the general principals and methodology of the present invention.

B. Creating one dimensional distance ramps. This section will discuss in detail the method for creating one dimensional distance ramps that are optimized for blending multiple projectors in complex intersection regions, and is one of the steps used in Section A.

A. Creating Blending Ramps for Complex Projector Intersections

FIGS. 5A, 5B, 5C and 5D show a process for the processing unit 18 of FIG. 1 for creating blending ramps for complex projector intersections according to an embodiment of the present invention. Unless specified otherwise, the method or steps discussed are performed by the processing unit 18, which as discussed below, may be implemented as a personal computer (PC) configured with a central processing unit (CPU) and graphic processing units (GPUs). One or more of the processing units or "processors" is used to execute the method or steps under control of software or firmware stored in memory in the PC or in an external memory such as computer-readable media.

Figure 5A:
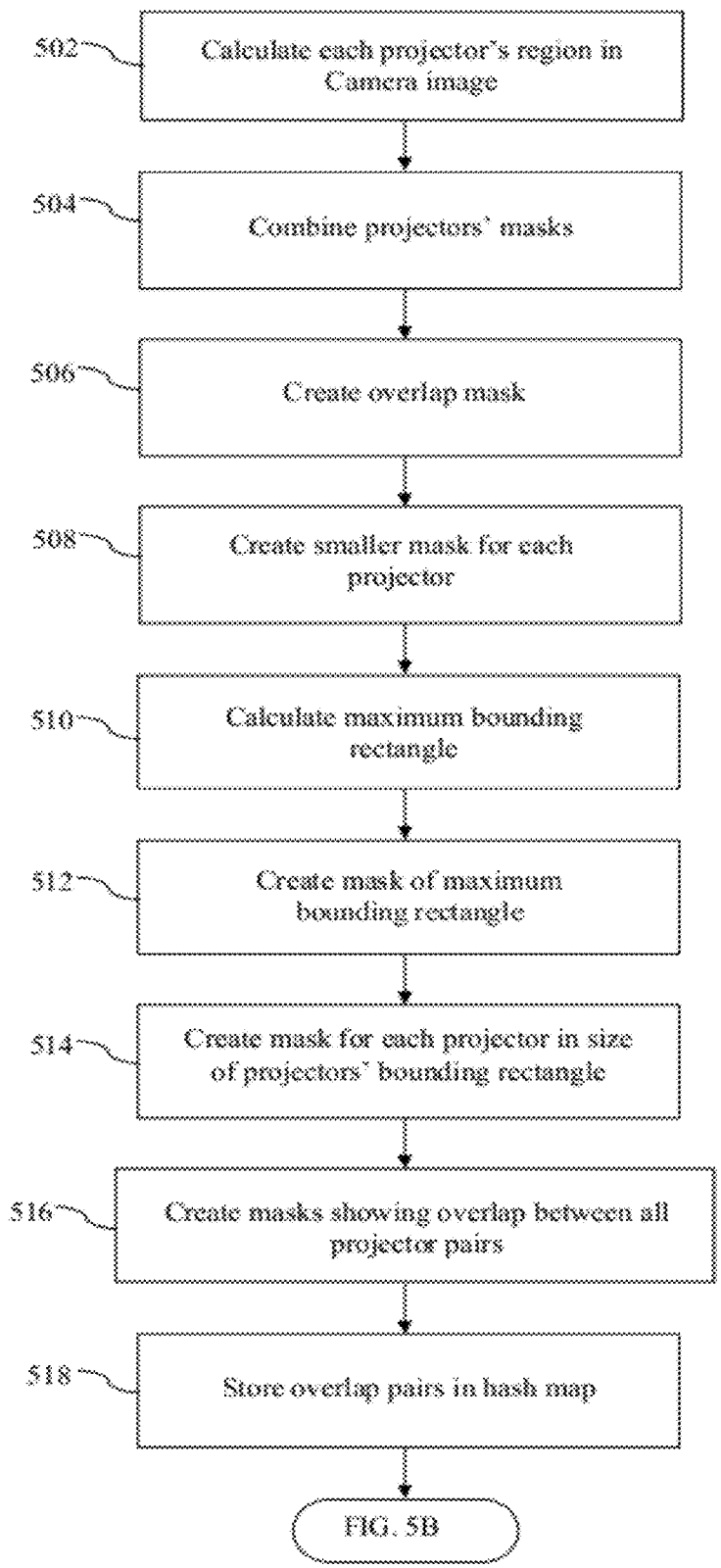
FIGS. 5A, 5B, 5C and 5D show a process for the processing unit to create blending ramps for complex projector intersections according to an embodiment of the present invention.
Figure 5B:
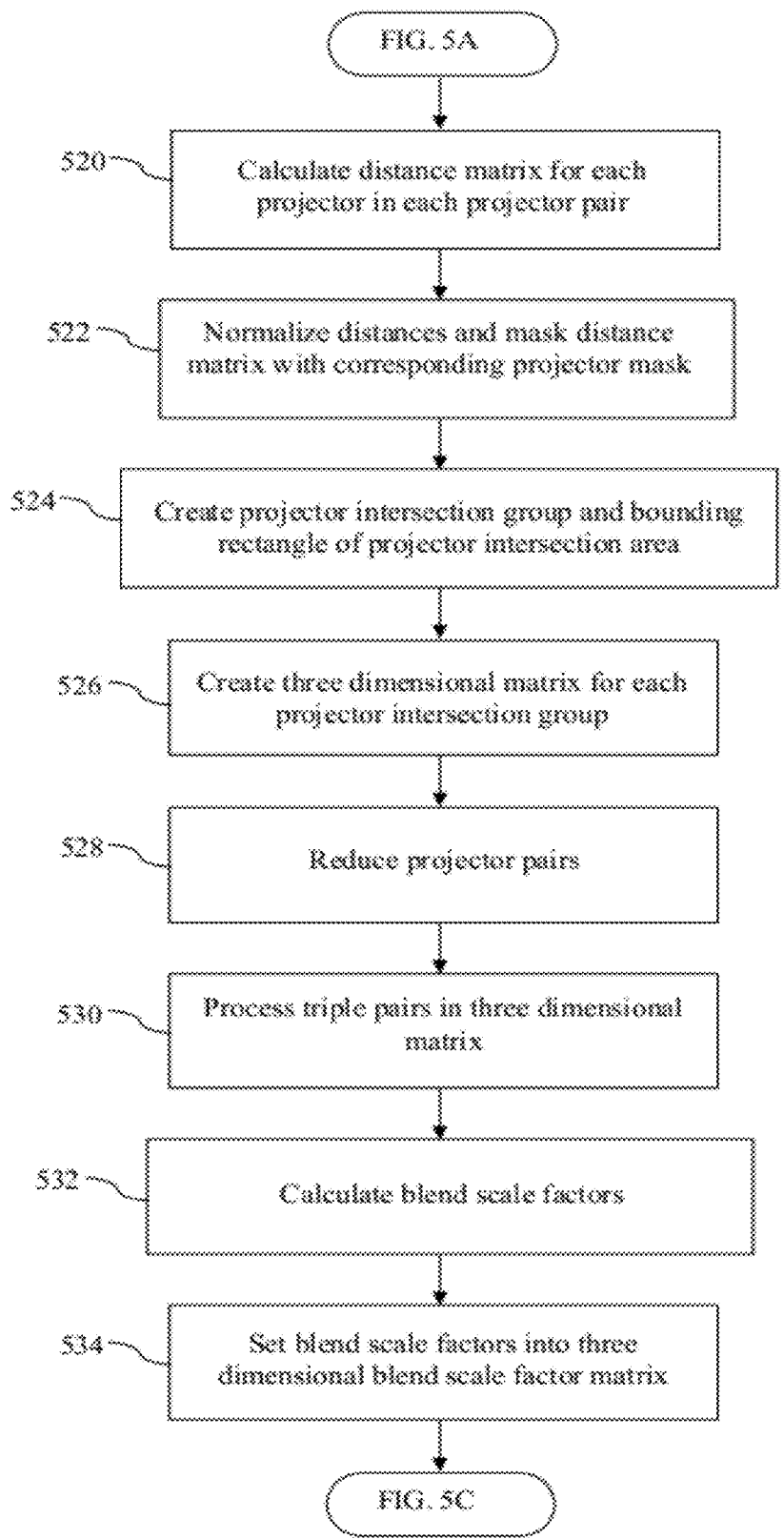
Figure 5C:
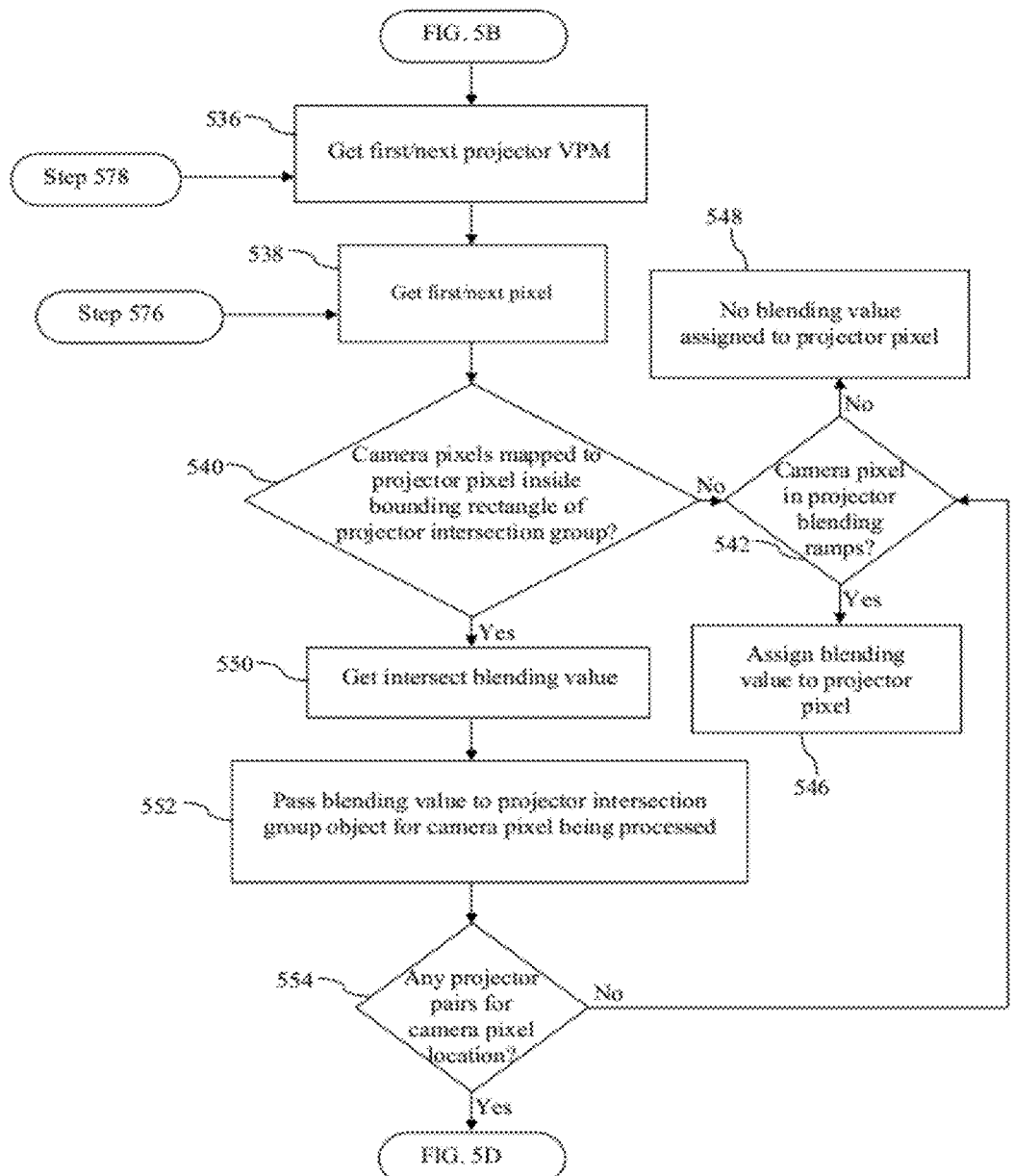
Figure 6:
FIG. 6 illustrates a combined projector mask (2×4 projector configuration)

Referring to FIG. 5A, first an accurate mask of each projector's region in the camera image is calculated by processing unit 18 (step 502). As is well known, masks delineate areas of an image or screen. As discussed above, processing unit 18 includes a calibration and registration unit 26 that creates an accurate pixel registration map of each projector. Each physical device pixel on a projector can be mapped to one or more logical pixels in a virtual region defining the large format display (composite image). This virtual region corresponds to the camera image and is referred to herein as a virtual pixel map (VPM). Thus, referring to FIG. 1, for example, projector 12B's region occupied by image 14B in the overall image captured by camera 20 can be calculated by processing unit 18. The individual projector masks are then combined to create a larger mask (step 504) that is the union of all the individual projector masks, as shown in FIG. 6. For all examples in this embodiment images from a 2×4 projector configuration (FIG. 4) are being used.

Figure 7:
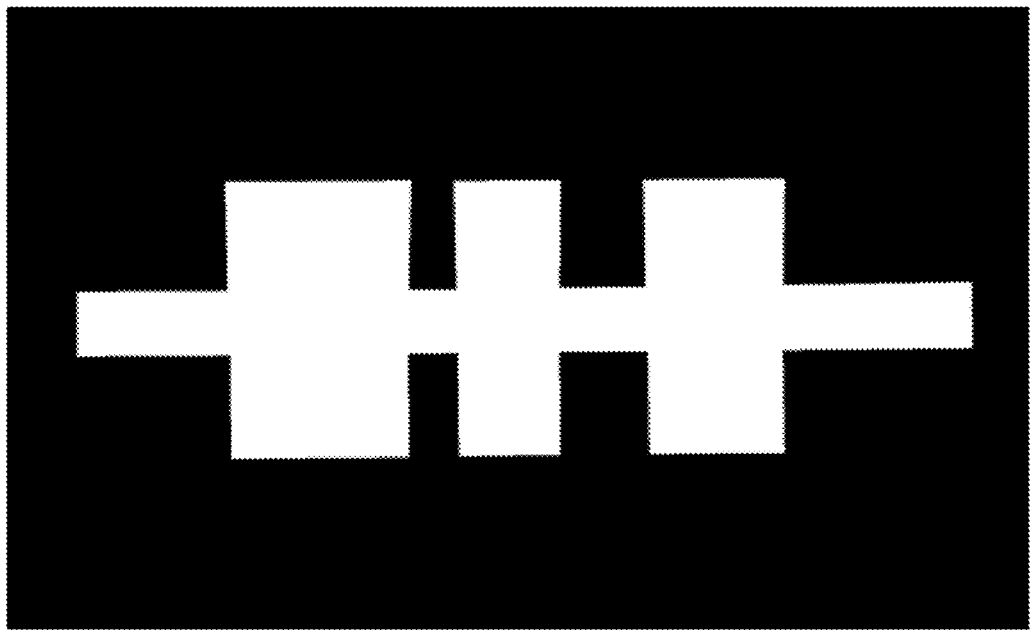
FIG. 7 illustrates an overlap mask (2×4 projector configuration)

Next an overlap mask is created (step 506) showing regions where two or more projectors overlap, as shown in FIG. 7.

The masks in FIGS. 6 and 7 are the same size as the camera images captured during the calibration process. In order to avoid working with the large camera images during processing, the projectors' bounding rectangle is calculated within the larger camera image. For many operations a mask is created in the size of the projectors' bounding rectangle for processing.

Next a smaller mask in the size of the projector's bounding rectangle is created for each projector (step 508). This mask has three possible values: overlap areas have a value of two, non overlap areas within the projector mask have a value of one, and areas outside projector mask have value of zero.

Figure 8:
FIG. 8 illustrates the maximum bounding rectangle (2×4 projector configuration)

Once the masks have been created, the maximum bounding rectangle is calculated (step 510). This is the largest horizontal rectangle that can fit inside the combined mask in FIG. 6. A mask of the maximum bounding rectangle is then created (step 512), as shown in FIG. 8.

Next, masks are created for each individual projector in the size of the projectors' bounding rectangle (step 514). The mask is the intersection of the projector mask and the maximum bounding rectangle mask. Also the bounds of the maximum bounding rectangle are calculated relative to the smaller projector region bounding rectangle.

Next masks are created showing the overlap between all possible projector pairs, first between neighbors in each row, then neighbors in each column, and then diagonally opposing neighbors (step 516).

Figure 9:
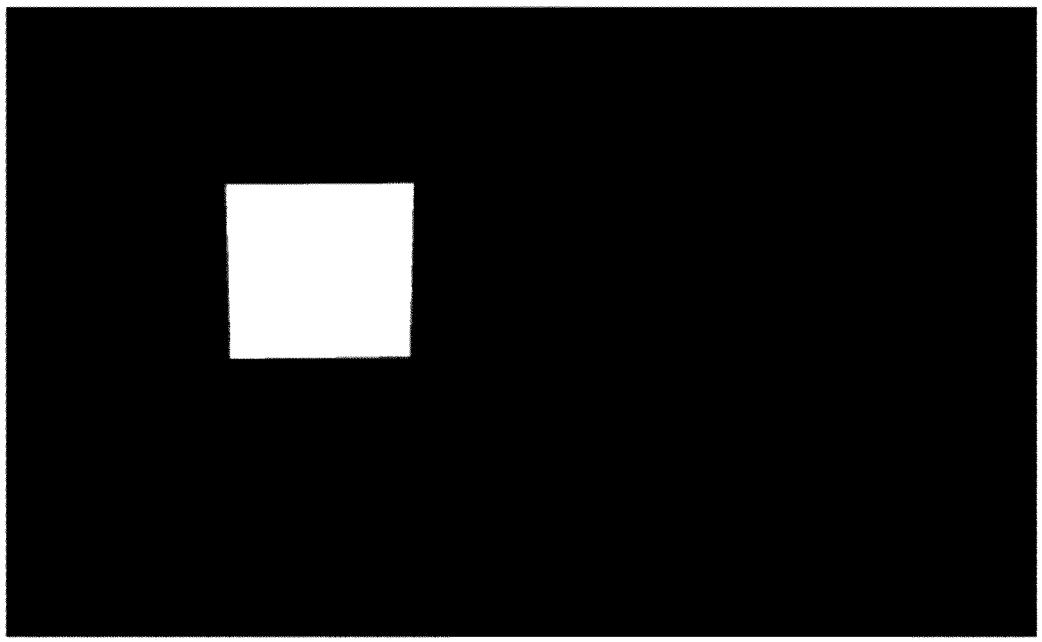
FIG. 9 shows the mask of the overlap region between projector 0 and projector 1, which is projector 0's neighbor in its row.
Figure 10:
FIG. 10 shows the mask of overlap region between projectors 0 and 4, which is projector 0's neighbor in its column.
Figure 11:
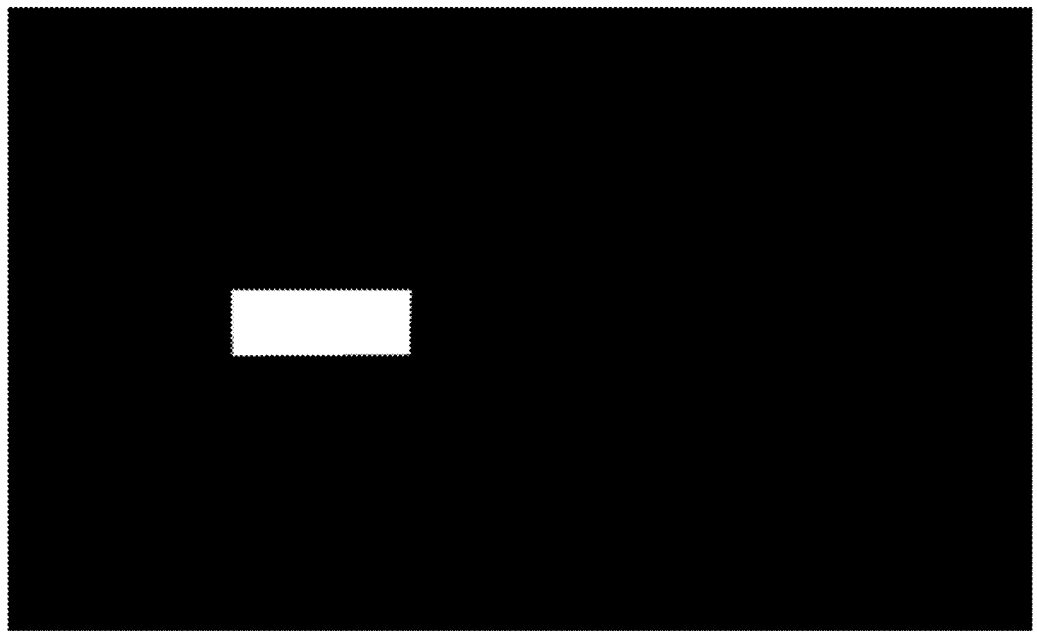
FIG. 11 shows the mask of the overlap region between projector 0 and projector 5, which is projector 0's diagonally opposed neighbor.

Referring to the projector arrangement shown in FIG. 4, the overlap between projector 0 and its neighbors are shown in FIGS. 9-11, as an example. FIG. 9 shows the mask of the overlap region between projector 0 and projector 1, which is projector 0's neighbor in its row. FIG. 10 shows the mask of overlap region between projectors 0 and 4, which is projector 0's neighbor in its column. FIG. 11 shows the mask of the overlap region between projector 0 and projector 5, which is projector 0's diagonally opposed neighbor.

All the possible overlap pairs are stored in a hash map with the pair numbers as the key and the mask image as the value associated with the key (step 518).

Processing unit 18 then iterates through all the key values in the hash map representing projector pairs that overlap in a vertical or horizontal direction, not including opposing projector pairs such the overlap shown in FIG. 11. For each projector in each projector pair the system creates a distance matrix for the projector. This is shown generally as step 520 in FIG. 5B, but calculation of the distance matrix is detailed as follows:

1) A mask the size of the projector bounding rectangle is created showing the overlap region with the second projector. Next the area outside the maximum bounding rectangle is removed from the mask.
2) A mask is created showing the non-overlap region in the first projector. This mask is limited to the area inside the maximum bounding rectangle.
3) The direction of the overlap region is calculated, either horizontal or vertical.
4) The mask in step 2 is used by processing unit 18 in a 1D image distance method that calculates the distance of zero valued pixels from the nearest one valued pixels in the specified direction, either horizontal or vertical. This 1D image distance method will be described in detail below in Section B.
5) The image distance matrix in step 4 is then masked with the maximum display area mask.

Once the distance matrix is calculated for each projector in the pair, the system will next normalize the distances between the two distance ramps adding the values of the two distance ramps to an accumulation matrix. Next each element of each distance matrix is divided by the values in the accumulation matrix. Each distance matrix is then masked with the corresponding projector mask (step 522).

Next, a projector intersection group is created for each 2×2 intersection. In the example used, three projector intersection groups are created for the projector groups [0, 1, 4, 5], [1, 2, 5, 6], and [2, 3, 6 7]. The bounding rectangle of the 2×2 projector intersection area is also calculated (step 524).

Next, a three dimensional matrix is created for each projector intersection group. This is shown generally as step 526 but is detailed as follows:

For each projector intersection group, the following steps are completed:

1. A small mask the size of the projector intersection bounding rectangle is created for each overlapping projector pair in the projector intersection group.
2. The horizontal overlap regions are compared. In the first projector intersection group [0, 1, 4, 5] this would be projectors [0, 1] and projectors [4, 5].
    2.1. The goal of the comparison is to find the horizontal overlap pair that covers the most area of the projector intersection rectangle with the simplest form.

2.2. Processing unit 18 compares the intersection of each horizontal mask and calculates the number of corners created by the intersection.
2.3. Processing unit 18 also counts the number of pixels remaining in the intersection
2.4. Both the corner count and pixel count values for each projector pair become operators in a directed graph. The directed graph is solved to find the pair of projectors with the simplest region shape and the largest coverage area in terms of pixels.
3. At this point the primary horizontal blending pair has been determined for the projector intersection group. A three dimensional matrix the size of the projector intersection bounding rectangle is created to hold projector pair objects. The matrix has four layers.
4. Using the cropped intersection mask processing unit 18 next sets the projector pair object in the first layer of the dimensional matrix to the values of the primary horizontal blending pair. For every pixel in the mask greater than zero the corresponding entry is set in the three dimensional matrix for the first layer.
5. Step 4 is repeated for the second horizontal blending pair but with values set in the three dimensional matrix in the second layer.
6. Step 4 is repeated for the left vertical blending pair in the third layer of the three dimensional matrix.
7. Step 5 is repeated for the right vertical blending pair in the fourth layer of the three dimensional matrix.
8. Next another matrix is created in the size of the projector intersection bounding rectangle. Each element of this matrix is set with the count of non-null values in the three dimensional matrix holding the overlapping projector pairs.
9. Next two blending ramps are created between the two horizontal blending pairs within the projector intersection bounding rectangle. Using the overlap masks for each horizontal projector pair (in this example [0, 1] and [4, 5]), the blending ramps are created in a similar manner as described above.
10. A second three dimensional matrix is created the size of the projector intersection bounding rectangle to hold blending scale values. The values calculated in step 9 for each blending ramp are set in the second matrix at the same layer as the location where the corresponding projector pair was found in the first three dimensional matrix.
11. The first three dimensional matrix is searched for any elements that does not have projector pairs set for any layers. Processing unit 18 then searches all projector blending ramps to find a projector pair with a value for this location.
12. If there are still remaining elements without values in the first three dimensional matrix (projector pair count for the element is zero), processing unit 18 creates a map of the missing locations.
13. Using the map in step 12 the missing values are grouped using connected components. For each group of pixels, the projector region with the best match to fill the group of pixels is determined. The best match is determined by computing the distance from the center of the group of pixels to the center of each projectors' bounding rectangle. The projector with the shortest distance is used. The values in the last layer of the first three dimensional matrix are set with a "single" projector pair containing only one value with the projector with the best match.

At this point each projector intersection group has a three dimensional matrix with the size of the projector intersection bounding rectangle and four layers deep filled with projector pair objects. The next step is a reduction process to find the set of projector pair values that will create the blending values for the projector intersection bounding rectangle (step 528).

The main processing loop for the layer reduction is outlined in the example code shown in FIG. 12. In the matrix the first two layers are horizontal layers which take highest priority as the horizontal blending is best for creating a seamless display as opposed to the vertical blending ramps. The reduce layer process is summarized as follows:

1) The method first searches the top two layers to see if horizontal projector pairs are present. If two horizontal projector pairs are found in the top two layers the values in the third and fourth layers are set to null.

2) If one horizontal projector pair is found the method next searches for any vertical projector pairs. If a vertical projector pair is found, the common projector for both pairs is determined and a "triple" projector pair is created with the values of the three projectors from the horizontal and vertical projector pairs. The horizontal projector pair is replaced with the newly created "triple" pair.

After the reduction process has completed, the processing unit 18 next processes the "triple" pairs in the three dimensional matrix (step 530). The processing loop for the triple pairs is outlined in the example code shown in FIG. 13.

The processTriplePairs( ) method does the following steps:
1) Each value of the three dimensional matrix is searched to see if a "triple" projector pair is present.
2) If a "triple" projector pair is found, the common projector is determined that is present in both the horizontal and vertical overlap regions for this position.
3) The two blending ramp values for the point are retrieved: one for the vertical blending ramp and one for the horizontal blending ramp for this element.
4) The values are compared to find the value that is greater (the dimmest value in terms of intensity for this element). The dimmest pair is set in the "triple" projector pair as the primary pair.

Next, the blend scale factors are calculated (step 532) in the method calculateBlendScaleFactors( ) as outlined in the example code shown in FIG. 14.

The method traverses the first three dimensional matrix calculating the number of non-null entries and also the layer where the first non-null value was found. If values were found in the first two layers, no more processing is needed as the blend scale factors were set with the blending ramp between the two horizontal overlap regions previously computed. For other elements a scale factor is computed by dividing one by the number of non-null elements. This value is set into the blend scale factor three dimensional matrix for all layers (step 534).

Now each projector's Virtual Pixel Map (VPM) is created which contains the intensity values for each projector pixel, controlling the blending ramps between projectors. A first projector (and later subsequent projectors) is selected for examination at step 536 of FIG. 5C. A first (and later subsequent pixels) is selected for examination at step 538. The next step is to calculate each projector pixel's intensity value (or blending value). As mentioned previously, in order to blend the output of two projectors, the intensity of the pixels that fall in the overlap region are modified. As a simple example, and referring to FIG. 1, projector 12A is controlled by processing unit 18 to output pixels at overlap edge 22A at 100% brightness and output pixels at overlap edge 22B at 0% brightness with a linear reduction of brightness of pixels from edge 22A to edge 22B. In a reciprocal manner, projector 12B is controlled by processing unit 18 to output pixels at overlap edge 22B at 100% brightness and output pixels at overlap edge 22A at 0% brightness with a linear reduction of brightness of pixels from the edge 22B to edge 22A. Blending ramps (or functions) for each pair of projectors that have overlapping regions are determined empirically by testing a function, modifying it if necessary, and testing it again until satisfactory results are achieved. This must be performed after the projectors are set up in a particular environment in a particular physical relationship. In the two projector configuration, the VPM for a projector will refer to the blending ramp to assign a pixel intensity value (e.g. 100%, 50%, 25%, etc.) during projection of an image.

Getting back to the present complex projector environment, each value of the VPM is processed. For each value a check is made to determine if the camera pixels mapped to each projector pixel are located inside the bounding rectangle of a projector intersection group (step 540). If not, the blending ramps for this projector are searched (step 542) to see if the camera pixels are located in any of the blending ramps (if a projector has two neighbors with overlap, it will have two blending ramps, one for each neighbor). If so, the blending value is returned, i.e. the blending value from the blending ramp is assigned to the projector pixel being checked (step 546). If not, no blending value is assigned to that pixel (e.g. its intensity remains at 100%) (step 548).

If the camera pixels mapped to the projector pixel are located within the bounding rectangle of a projector intersection group, the getIntersectBlendingValue( ) method is called (step 550). The method is outlined in the example code shown in FIGS. 15A and 15B.

The getIntersectBlendingValue( ) is passed to the projector intersection group object for the location of the camera point (pixel) being processed (step 552). The method first checks the three dimensional projector pair array (matrix). If there are no projector pairs for the camera pixel location, the method searches for a blending ramp as above for the camera pixel and returns the intensity value (method loops back to step 542).

Figure 16A:
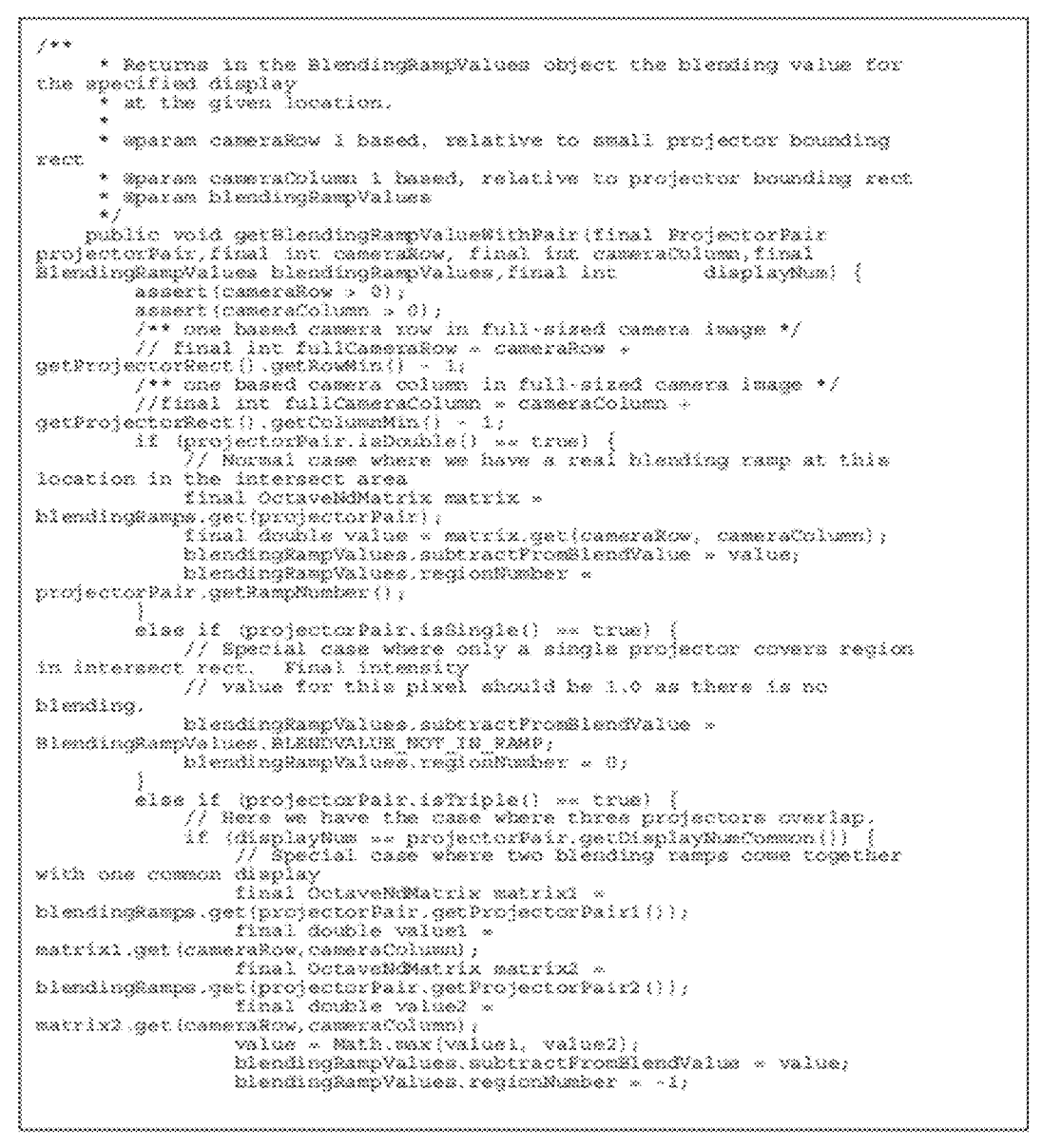

If a projector pair is found for the location the getBlendingRampValueWithPair( ) method, as outlined in the example code shown in FIGS. 16A and 16B, is called to calculate the blending value for the location.

Figure 5D:
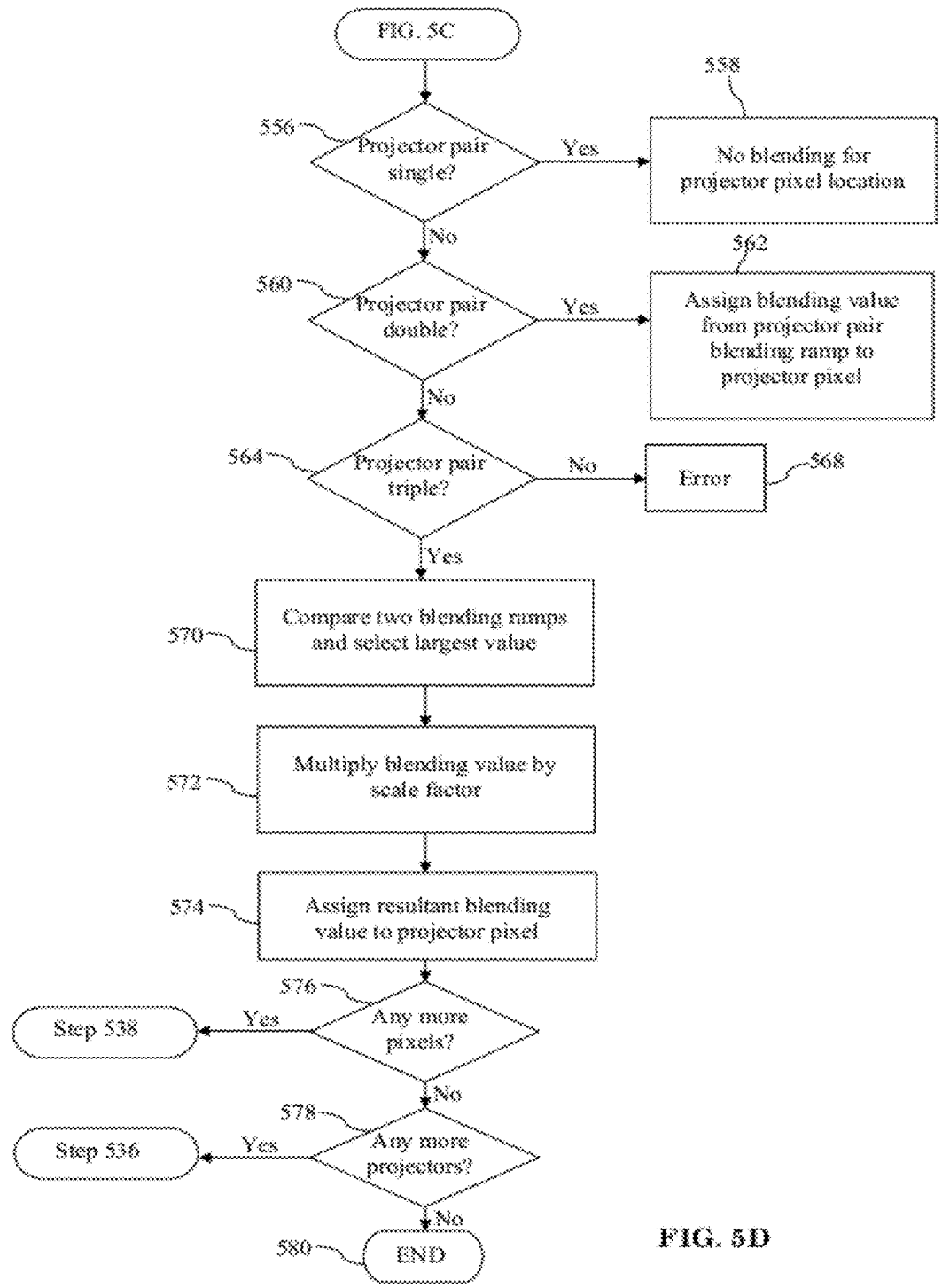

Referring to FIG. 5D, the getBlendingRampValueWithPair( )method first checks for the type of projector pair. If the projector pair is a "single" (step 556 returns Yes) there is no blending for the location (step 558).

If the projector pair is a "double" (step 560 returns Yes) the blending ramp for the pair is accessed for the blending value at this location (step 562).

If the projector pair is a "triple" (step 564 returns Yes) the values for the two blending ramps are compared and the largest value (dimmest intensity) is selected (step 570). Recall that if a blending ramp value is 25, for example, the pixel at that location is output at 25% brightness. So, a higher blending value results in lower intensity. The blending value is returned to the method getIntersectBlendingValue( ) where the blend scale factor is accessed for the location. If the blend scale factor has been set, the blending intensity value is multiplied by the blend scale factor (step 572) and the resultant blending value is assigned to that projector pixel. If step 564 returns No, there is an error (step 568).

The process checks for more pixels (step 576) and loops back to step 538 until blending values for all pixels in one projector's VPM have been set (step 576 returns No). The process then checks for more projectors (step 578) and loops back to step 536 until blending values for all pixels in all projectors' VPMs have been set (step 578 returns No), in which case the process ends (step 580). These blending values are used during playback to set the proper intensity value for projector pixels that overlap with one or more projectors. The end result is a seamless multi-projector display where the overlap regions have an intensity that is consistent with the non-overlap regions of the display.

B. Creating One Dimensional Distance Ramps

This section will discuss in detail the method for creating one dimensional distance ramps that are optimized for blending multiple projectors in complex intersection regions, and is one of the steps used in Section A.

Figure 17:
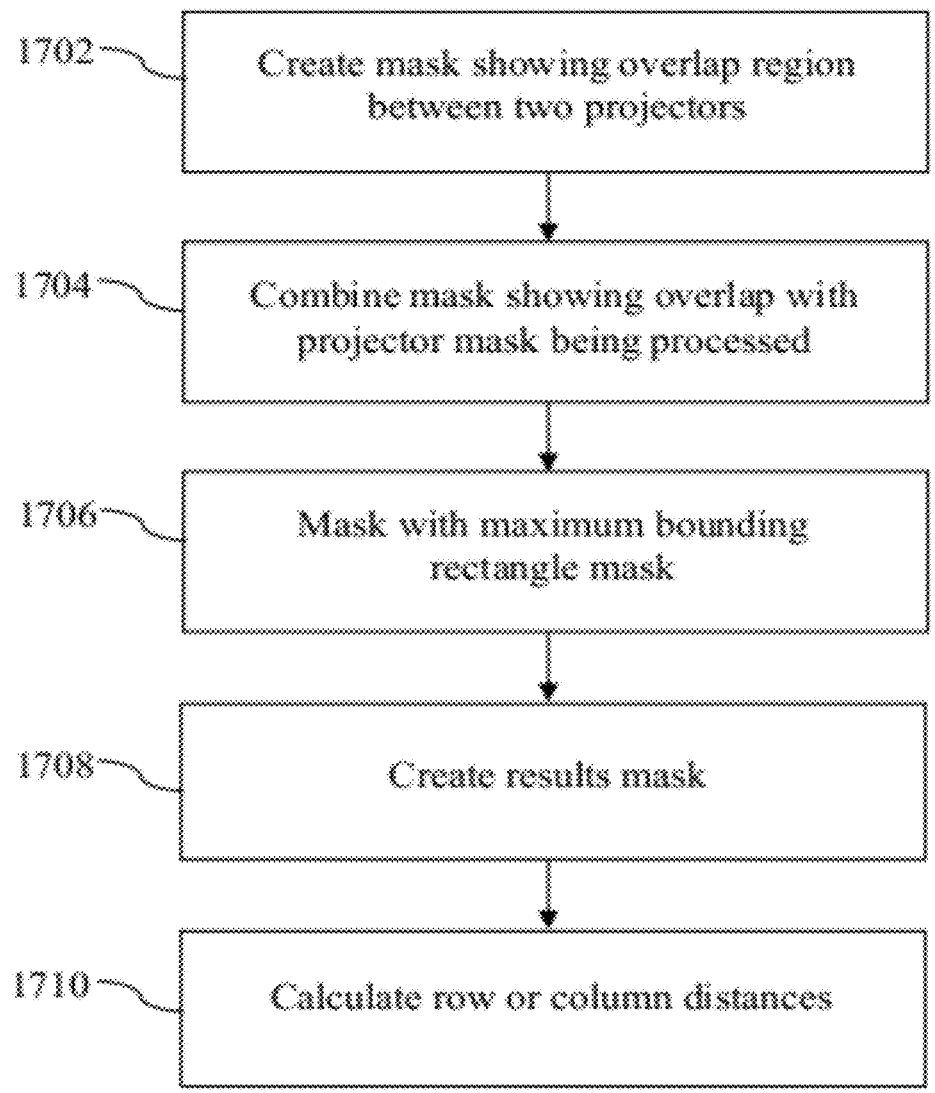
FIG. 17 shows a process for the processing unit to calculate one dimensional image distances.

The function of the one dimensional image distance method is to calculate the distance of zero valued pixels from the nearest non-zero value pixel in the direction specified. The two options for specifying the direction are row (horizontal) and column (vertical). The method is shown generally in FIG. 17.

First a mask image is created showing the overlap region between two projectors (step 1702). The mask is created by combining the two projector masks using an AND operation.

Next the mask showing the overlap region is combined with the projector mask being processed using and XOR operation (step 1704). This creates white pixels in the regions outside of the overlap region.

Next the mask is masked with the maximum bounding rectangle mask (step 1706). The maximum bounding rectangle is the largest rectangle that will fit inside the area of the combined projector region. The end result is the mask shown in FIG. 18.

Figure 19:
FIG. 19 illustrates the results mask.

Next a results mask is created (step 1708). This mask is white in all the pixel locations that require a value. This mask is created by using an AND operation between the two projector masks. This mask is also masked by the maximum display area mask. FIG. 19 shows the results of these operations.

Once the input masks are created either the row or column distances are calculated based on the given input value. This is shown generally as step 1710 in FIG. 17 but is discussed in detail below.

The following will describe the process for calculating column distances. The calculation of row distance follows a similar process.

First, each column of the image is processed. For each column in the image a distance array the same height of the image is created. Each element of the distance array is then filled with a distance value (if any) in the method processLine( ) outlined in the example code shown in FIG. 20.

The method first searches from the beginning and ends of a column pixel buffer to find the first and last non-zero values. The method will next set the values in the beginning and end of the distance array with the calculated distance from the non-zero values. Next the method searches from the start and end offsets of the non-zero values to find any zero value pixel runs with this range. For each zero pixel the column buffer is searched to find the start and end offset of contiguous zero pixels. Once the start and end offset of the run of zero pixels is determined, a PixelRun object is created that holds the start and end offsets. The PixelRun objects are initially stored in a list.

Next, each PixelRun object is processed first by calculating the mid point offset of the contiguous zero pixels. The distance from the non-zero pixels are then calculated and set in the distance array for this run of zero pixels. The distance column values are then copied into a larger distance matrix which is the same size as the input image.

Next, the method checkMaskColumns( ) is called to determine if any non-zero pixels in the results mask do not have distance values. The checkMaskColumns( ) method is outlined in the example code shown in FIG. 21.

The method iterates through each row of the results mask, extracting the image row and also the row of corresponding distance values. The two arrays are then passed to the method processMaskLine( ) which then compares the mask array to the distance array. The method processMaskLine( ) is outlined in the example code shown in FIG. 22.

The method first sets distance array values to zero wherever a zero valued pixel is found in the mask array. If non-zero values were found, the method next calculates the positions of the first start and end non-zero values in the distance array. Next the method will search through the distance array to find any pixels where the distance was not set. If a pixel in the distance array was found to be not set, the previous non-zero value is replicated to this pixel.

Next, the method searches from the start of the first non-zero pixel to the beginning of the buffer looking for any distance values that are zero where the mask is non-zero. If such a pixel is found the next distance value is replicated. The same is done from the last non-zero pixel to the end of the array. If a zero distance value is found where the mask is non-zero, the distance from the previous pixel is replicated.

Once the method returns and changes were made to the distance array, the new values for the row are copied into the distance matrix.

Figure 18:
FIG. 18 illustrates the input image mask.

Next, the distance matrix is processed to filter out any large changes within the matrix that may be caused by small fragments in the mask near the edges such as found in FIG. 18 near the right edge. Such fragments, if not processed, cause overly bright pixels in the blending ramp since their distance from the nearest non-zero pixel is very low. The method filterColumns( ) is outlined in the example code shown in FIG. 23.

First, the method calculates the average value for the non-zero values in the distance matrix row. Next acceptable minimum and maximum distance values are calculated using a variance factor now set to 0.30 which has yielded good results. The row of the distance matrix is searched for any distance values less than or greater than the minimum and maximum distance values in the method correctInvalidItems( ). The correctInvalidItems( ) method outlined in the example code shown in FIG. 24.

The method checks each value in the distance matrix row. If the distance is less than or greater than the minimum and maximum acceptable values, the method then calculates an average of the values before and after the out of range value. Currently the method searches four pixels before and after up to the beginning or end of the line or up to the first zero value pixel. The average calculated from non-zero distance values is then used to set the out of range distance value.

Figure 25:
FIG. 25 shows the distance matrix converted to a Gray scale image.

At this point the process has been completed and the calculated distance matrix is returned to the main processing method of the present invention described in Section A above. FIG. 25 shows the distance matrix converted to a Gray scale image.

The present invention may be embodied on a computer-readable medium having instructions that, when executed by a computer or processing unit(s), perform the method(s) of the present invention. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for applying blending values to projector pixels in a system where two or more projectors project onto a surface and an image projected from one projector overlaps with at an image from at least one other projector comprising:
   projecting from a first projector a first image onto a display area;
   projecting from a second projector a second image onto the display area at the same time the first image is being projected, the second image overlapping the first image in an overlap portion of the display area to form a double projector overlap image;
   projecting from a third projector a third image onto the display area at the same time the first and second images are being projected, the third image overlapping the first and second images in an overlap portion of the display area to form a triple projector overlap image;
   determining if a first projector pixel projects onto the surface to form the triple projector overlap image, and
   if the first projector pixel projects onto the surface to form the triple overlap image,
   comparing first and second blending values, the first blending value associated with one pair of projectors and the second blending value associated with a different pair of projectors, and selecting the largest blending value,
   multiplying the largest blending value by a scale factor to obtain a resultant blending value, and
   assigning the resultant blending value to the first projector pixel.

2. The method of claim 1 further comprising:
   determining if the first projector pixel projects onto the surface to form the double projector overlap image, and
   if the first projector pixel projects onto the surface to form the double projector overlap image applying the first blending value to the first projector pixel, the first blending value being associated with the first projector and the second projector or third projector.

3. The method of claim 2 further comprising:
   capturing the display area with a camera to create a camera image;
   and calculating for each of the first, second, and third projectors a projector region in the camera image.

4. The method of claim 3 further comprising:
   creating masks showing an overlap between all projector pairs; and
   storing the masks in a map.

5. The method of claim 4 further comprising:
   calculating the distance of zero valued pixels from the nearest non-zero value pixel in a horizontal or vertical direction.

6. A system for applying blending values to projector pixels where two or more projectors project onto a surface and an image projected from one projector overlaps with at an image from at least one other projector comprising:
- a first projector that projects a first image onto a display area;
- a second projector that projects a second image onto the display area at the same time the first image is being projected, the second image overlapping the first image in an overlap portion of the display area to form a double projector overlap image;
- a third projector that projects a third image onto the display area at the same time the first and second images are being projected, the third image overlapping the first and second images in an overlap portion of the display area to form a triple projector overlap image; and
- a processing unit that determining if a first projector pixel projects onto the surface to form the triple projector overlap image, and
  - if the first projector pixel projects onto the surface to form the triple overlap image,
  - compares first and second blending values, the first blending value associated with one pair of projectors and the second blending value associated with a different pair of projectors, and selects the largest blending value,
  - multiplies the largest blending value by a scale factor to obtain a resultant blending value, and
  - assigns the resultant blending value to the first projector pixel.

7. The system as in claim 6, wherein the processing unit further
- determines if the first projector pixel projects onto the surface to form the double projector overlap image, and
  - if the first projector pixel projects onto the surface to form the double projector overlap image applies the first blending value to the first projector pixel, the first blending value being associated with the first projector and the second projector or third projector.

8. The system as in claim 7, further comprising:
- a camera that captures the display area to create a camera image;
- and wherein the processing unit further calculates for each of the first, second, and third projectors a projector region in the camera image.

9. The system as in claim 8 wherein the processing unit further:
- creates masks showing an overlap between all projector pairs; and
- stores the masks in a map.

10. The system as in claim 9 wherein the processing unit further:
- calculates the distance of zero valued pixels from the nearest non-zero value pixel in a horizontal or vertical direction.

11. A non-transitory computer-readable medium embodying instructions executable by a computer to perform a method for applying blending values to projector pixels in a system where two or more projectors project onto a surface and an image projected from one projector overlaps with at an image from at least one other projector, the method comprising:
- projecting from a first projector a first image onto a display area;
- projecting from a second projector a second image onto the display area at the same time the first image is being projected, the second image overlapping the first image in an overlap portion of the display area to form a double projector overlap image;
- projecting from a third projector a third image onto the display area at the same time the first and second images are being projected, the third image overlapping the first and second images in an overlap portion of the display area to form a triple projector overlap image;
- determining if a first projector pixel projects onto the surface to form the triple projector overlap image, and
  - if the first projector pixel projects onto the surface to form the triple overlap image,
  - comparing first and second blending values, the first blending value associated with one pair of projectors and the second blending value associated with a different pair of projectors, and selecting the largest blending value,
  - multiplying the largest blending value by a scale factor to obtain a resultant blending value, and
  - assigning the resultant blending value to the first projector pixel.

12. The non-transitory computer-readable medium of claim 11, wherein the method further comprises:
- determining if the first projector pixel projects onto the surface to form the double projector overlap image, and
  - if the first projector pixel projects onto the surface to form the double projector overlap image applying the first blending value to the first projector pixel, the first blending value being associated with the first projector and the second projector or third projector.

13. The non-transitory computer-readable medium of claim 12, wherein the method further comprises:
- capturing the display area with a camera to create a camera image;
- and calculating for each of the first, second, and third projectors a projector region in the camera image.

14. The non-transitory computer-readable medium of claim 13, wherein the method further comprises:
- creating masks showing an overlap between all projector pairs; and
- storing the masks in a map.

15. The non-transitory computer-readable medium of claim 14, wherein the method further comprises:
- calculating the distance of zero valued pixels from the nearest non-zero value pixel in a horizontal or vertical direction.

* * * * *